US009185714B2

(12) United States Patent
Friday et al.

(10) Patent No.: US 9,185,714 B2
(45) Date of Patent: Nov. 10, 2015

(54) METHOD AND SYSTEM FOR DYNAMICALLY ASSIGNING CHANNELS ACROSS MULTIPLE RADIOS IN A WIRELESS LAN (71) Applicant: Cisco Technology, Inc., San Jose, CA (US)

(72) Inventors: Robert J. Friday, Los Gatos, CA (US); Patrice R. Calhoun, Sunnyvale, CA (US); Robert B. O'Hara, Jr., Chandler, AZ (US); Alexander H. Hills, Palmer, AK (US); Paul F. Dietrich, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 61 days.

(21) Appl. No.: 13/918,668

(22) Filed: Jun. 14, 2013

(65) Prior Publication Data
US 2014/0029526 A1    Jan. 30, 2014

Related U.S. Application Data (63) Continuation of application No. 12/540,904, filed on Aug. 13, 2009, now Pat. No. 8,488,524, which is a continuation of application No. 10/913,561, filed on Aug. 6, 2004, now Pat. No. 7,593,356, which is a continuation-in-part of application No. 10/183,704, filed on Jun. 25, 2002, now Pat. No. 7,327,697.

(51) Int. Cl.
*H04J 3/08* (2006.01)
*H04W 72/08* (2009.01)
(Continued)

(52) U.S. Cl.
CPC ............. *H04W 72/082* (2013.01); *H04B 17/24* (2015.01); *H04B 17/309* (2015.01);
(Continued)

(58) Field of Classification Search
CPC ........ H04W 76/02; H04W 84/12; H04B 15/00
USPC .............. 455/440, 452.1, 13.1, 423; 370/328, 370/252, 338, 230
See application file for complete search history.

(56) References Cited

U.S. PATENT DOCUMENTS 5,335,246 A * 8/1994 Yokev et al. .................. 375/133
5,519,697 A * 5/1996 Fujita et al. .................. 370/338
(Continued)

OTHER PUBLICATIONS

Brelaz, "New Methods to Color the Vertices of a Graph," *Communications of the ACM*, vol. 22, No. 4, pp. 251-256, Apr. 1979 (online).
(Continued)

*Primary Examiner* — Wesley Kim
*Assistant Examiner* — Richard Chan
(74) *Attorney, Agent, or Firm* — Baker Botts L.L.P.

(57) ABSTRACT

According to one embodiment, a method includes monitoring, at one or more wireless network access elements, signal strength of signals transmitted by respective neighboring wireless network access elements. Information is collected from said wireless network access elements and converted into reportable data about signal strength observed during the monitoring. The method further includes identifying, based at least in part on interference associated with concurrent signal transmissions of the wireless network access elements, a combination of channel assignments for the one or more wireless network access elements from a plurality of possible combinations of channel assignments and assigning channels for concurrent, respective use by said wireless network access elements based on the identified combination of channel assignments.

14 Claims, 2 Drawing Sheets (51) Int. Cl.
*H04B 17/24* (2015.01)
*H04B 17/309* (2015.01)
*H04B 17/382* (2015.01)
*H04W 84/12* (2009.01)
*H04W 72/04* (2009.01)
*H04B 17/318* (2015.01)

(52) U.S. Cl.
CPC ............ *H04B 17/382* (2015.01); *H04W 72/08* (2013.01); *H04B 17/318* (2015.01); *H04W 72/0486* (2013.01); *H04W 72/085* (2013.01); *H04W 84/12* (2013.01)

(56) References Cited

U.S. PATENT DOCUMENTS

| | | | |
|---|---|---|---|
| 5,633,888 A * | 5/1997 | Stewart | 375/132 |
| 5,684,860 A | 11/1997 | Milani | |
| 5,749,044 A | 5/1998 | Natarajan et al. | |
| 5,809,059 A * | 9/1998 | Souissi et al. | 375/133 |
| 6,175,739 B1 | 1/2001 | Ishii et al. | |
| 6,643,278 B1 * | 11/2003 | Panasik et al. | 370/330 |
| 6,760,318 B1 | 7/2004 | Bims | |
| 6,788,658 B1 | 9/2004 | Bims | |
| 6,925,070 B2 | 8/2005 | Proctor | |
| 7,024,188 B2 | 4/2006 | Khun-Jush et al. | |
| 7,236,786 B2 * | 6/2007 | Shen et al. | 455/436 |
| 7,248,841 B2 * | 7/2007 | Agee et al. | 455/101 |
| 7,593,356 B1 * | 9/2009 | Friday et al. | 370/278 |
| 2002/0188723 A1 | 12/2002 | Choi | |
| 2003/0023746 A1 | 1/2003 | Loguinov | |
| 2003/0134648 A1 | 7/2003 | Reed et al. | |
| 2003/0188006 A1 | 10/2003 | Bard | |
| 2003/0198208 A1 | 10/2003 | Koos | |
| 2004/0078598 A1 | 4/2004 | Barber et al. | |
| 2004/0121827 A1 * | 6/2004 | Murakami et al. | 455/575.7 |
| 2006/0099952 A1 | 5/2006 | Prehofer | |
| 2008/0293371 A1 * | 11/2008 | Kishigami et al. | 455/278.1 |

OTHER PUBLICATIONS

Randall-Brown, "Chromatic Scheduling and the Chromatic Number Problem," *Management Science* vol. 19, No. 4, pp. 456-463, Dec. 1972.

International Standard, ISO/IEC 8802-11 ANSI/IEEE Std. 802.11, 1999 edition, Part II: Wireless LAN Medium Access control (MAC) and Physical Layer (PHY) specifications, pp. 122-137.

"tcp-masq" Internet citation http://speed.cis.nctu.edu.tw/bandwith/opensource/, Daa Sheet Cisco Aironet 1200 Series Access Point, pp. 1-13, posted Mar. 11, 2002.

* cited by examiner

METHOD AND SYSTEM FOR DYNAMICALLY ASSIGNING CHANNELS ACROSS MULTIPLE RADIOS IN A WIRELESS LAN

CROSS REFERENCES TO RELATED APPLICATIONS

The present application is a continuation of U.S. application Ser. No. 12/540,904 filed Aug. 13, 2009 and entitled "Method and System for Dynamically Assigning Channels Across Multiple Radios in a Wireless LAN." which is a continuation of U.S. application Ser. No. 10/913,561 filed Aug. 6, 2004 and entitled "Method and System for Dynamically Assigning Channels Across Multiple Radios in a Wireless LAN" now U.S. Pat. No. 7,593,356 issued Sep. 22, 2009 which is a continuation-in-part of U.S. application Ser. No. 10/183,704 filed Jun. 25, 2002 and entitled "Method and System for Dynamically Assigning Channels Across Multiple Radios in a Wireless LAN" now U.S. Pat. No. 7,327,697 issued Feb. 5, 2008.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

This invention relates to wireless Local Area Networks (wireless LANs) and more specifically to the area of dynamic channel assignment for wireless LANs. Wireless protocols, such as the 802.11 family of protocols for WLANs, make use of a finite number of fixed channels. Each channel is a distinct communication path between an access element and a client remote element, such as a mobile station. Each access element must be assigned a specific fixed channel for operation, and all neighboring access elements must avoid using the same channel in order to minimize interference. The task of assigning channels to access elements in a network is also known as 'graph coloring,' (after the corresponding mathematical concept) where each access element represents a node and each color represents a specific channel. When two neighboring access elements use the same channel (or partially spectrally overlapping channels where such is possible), interference occurs that significantly degrades communication performance.

An optimally configured wireless network ensures that all potentially interfering (neighboring) access elements are configured to minimize the possibility of channel duplication. However, certain wireless protocols (e.g., 802.11b) provide for only a small number of spectrally non-overlapping channels assignable to the access elements, depending for reliability of communication more on the ad hoc lack of density of access elements and low levels of activity in a limited region of propagation. Thus it is impossible to ensure that neighboring access elements do not use duplicate channels in denser, physically realizable networks. With such technologies, other factors must be used to assist in the management of channel assignment.

Because of minimal interference in licensed bands, prior art in licensed spectrum cellular networks has dealt with the frequency reuse problem as a two-dimensional color map problem, ignoring interference as a factor. The nature of the interference sources in the unlicensed bands and the frequent changes in the environment of wireless LAN systems requires that the wireless channel assignment techniques be highly dynamic to maintain optimal performance. Additionally, the subscriber load of such a network must be taken into account to ensure that the best channels are allocated where needed.

Known WLAN products (such as those marketed by Cisco Systems) have a dynamic channel selection feature. Those WLAN products 'listen' for traffic on each of the channels available and then choose the one with the least amount of detected traffic during the period of the selection process. However, such methods of channel selection are made with limited local information and do not take into account the needs of neighboring access elements. In a fully distributed WLAN network, access elements make channel selections independent of each other, which leads to suboptimal use of channels as network resources.

By their licensed nature, cellular systems are subject only to self interference so that by definition all channels are treated equally. An example of a patent which describes dynamic channel assignments in a cellular system is U.S. Pat. No. 5,749,044 entitled "Centralized Dynamic Channel Assignment Controller and Methods." A further example of automatic channel assignment in a cellular system is U.S. Pat. No. 6,175,739 entitled "Channel Selection Method of a Wireless Communication System." The systems therein described fail to address the interfering channel problem.

Conventional networking design isolates and modularizes various communication tasks into layers. The ISO model calls for a physical layer, a media access control layer and a routing layer, as well as an application layer. The model does not provide for ready visibility of activities across layers and, particularly, visibility of activities in other than neighboring layers.

There are known solutions to the graph coloring problem using various algorithmic approaches. One such approach is called the "greedy" approach wherein the most important nodes are "colored" or assigned first and then less-important nodes are subsequently colored or assigned. Representative references are D. Brelaz, "New Methods to Color the Vertices of a Graph," Communications of the ACM, vol. 22, no. 4, April 1979, pp. 251-256 and J. Randall-Brown, "Chromatic Scheduling and the Chromatic Number Problems," Management Science, vol. 19, no. 4, December 1972, pp. 456-463. Work has been done in this field at Carnegie-Mellon University to solve problems related to static assignment of radio channels to base stations based on overlapping coverage areas. This work has not been published but is the subject of a prior-filed patent application in the names of Hills and Schlegel assigned to Carnegie-Mellon University and will be considered prior art in due course.

What is needed is a technique which takes into account interference from other competing systems and inband (industrial) devices, and network traffic load, and which recognizes that the available channels are not of equal priority in a dynamic environment.

SUMMARY OF THE INVENTION

According to the invention, in a fixed channel wireless network with a limited number of channels, assignment of the fixed channels to the access elements is made systematically according to a set of criteria based on network load, interference among access elements, interference arising outside the network, and noise. Channel assignments are then dynamically updated to maintain optimal network performance with changing conditions of load, interference and noise. The access element load or utilization is addressed by centrally monitoring all the traffic to and from the access elements. The interference and noise are treated as either 1) energy of a common protocol (e.g., 802.11 energy) from within the network, interference from competing or "foreign" energy of a common protocol (e.g., other 802.11 wireless LAN systems (hereinafter also called recognizable interference) or 2) non recognized energy (e.g. non-802.11 noise) from physical sources such as microwave ovens (hereinafter also called physical interference). Four matrices are used to represent 1) the access element load, 2) the recognizable interference from other wireless LAN networks, 3) other physical interference, and 4) signal strength between access elements. These four matrices are combined to form a total noise and interference matrix that represents the cumulative effect of noise and interference sources. A channel set is then selected that minimizes this effect and thus maximizes user performance. The four parameter matrices which are managed and updated by a central resource management element shall be referred to as the signal strength matrix, the recognizable interference matrix, the physical interference matrix, and the load matrix. In one implementation, the channel assignment methodology takes into account the interference associated with access elements operating on a selected channel, as well as the interference or energy that spills over (or is otherwise observable) on physical channels adjacent to the selected channel.

The advantages of this invention relate to how it incorporates the load and the interference of the network in the channel assignment process and the speed at which it can dynamically update the channel assignments of the participating radios (client remote elements). For example, a highly loaded access element might have priority for a low interference channel over a lightly loaded neighboring access element, since the highly loaded access element requires a channel that will provide optimal network performance.

In one embodiment, the present invention accounts for interference due to the energy that "spills over" to adjacent channels from the operation of access elements operating on given channels. That is, in one embodiment, the present invention accounts for the contribution of signal measurements on a given channel from the access elements on different physical channels (e.g., first adjacent channels in the 802.11a protocol, and several adjacent channels in the 802.11b protocol). Accounting for the interference observed at adjacent channels from operation of the access elements allows for deployment of access elements in denser arrangements, while minimizing interference among access elements due to channel re-use. In 802.11b WLAN environments, embodiments of the present invention also allow for use of over-lapping channels in the available range of physical channels.

The present invention does not follow the ISO model of isolating information between the layers of protocols. The centralized Radio Resource Manager has access to information from the physical layer, the MAC layer and the IP layer allowing it to make better decisions on resource allocation and configuration at the physical layer.

The invention will be better understood by reference to the following detailed description in and to the accompanying drawings.

DETAILED DESCRIPTION OF SPECIFIC EMBODIMENTS

Figure 1:
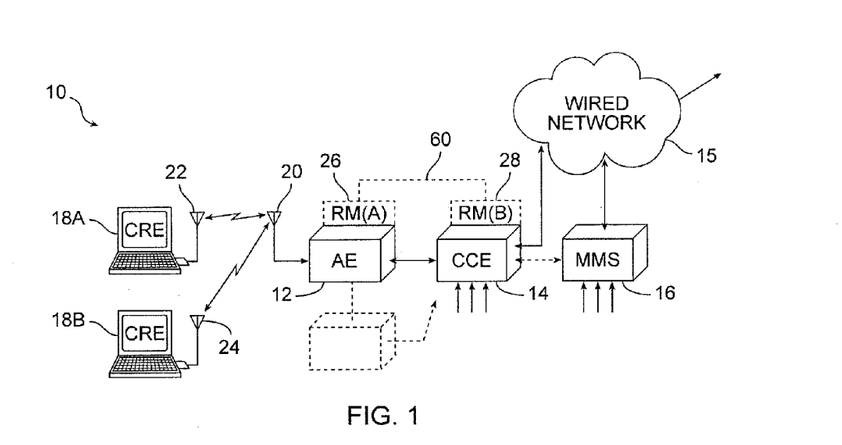
FIG. 1 is a block diagram of a system incorporating the invention.

Reference is made to FIG. 1. A specific embodiment of the invention comprises a wireless communication system 10 which includes an access element 12, a central control element 14, a network management system 16 and one or more client remote elements 18A, 18B in wireless contact on one of a limited number of wireless channels. The access element 12 includes the means to communicate with the client remote elements 18A, 18B using a wireless LAN protocol, usually via conventional antennas 20, 22, 24. The control and network management functionality according to the invention is imbedded in and distributed between the access element 12 and the central control element 14 as Resource Manager (A) module 26 and Resource Manager (B) module 28, as hereinafter explained. Data is communicated to a wired network 15 with the outside world. The network management system 16 is in logical communication with the central control element 14 for control purposes. The Radio Resource Manager (RM [60]) is distributed across the radio access element (AE) 12 and the centralized control element (CCE) 14 and provides an interface to the Network Manager System (NMS) 16.

Figure 2:
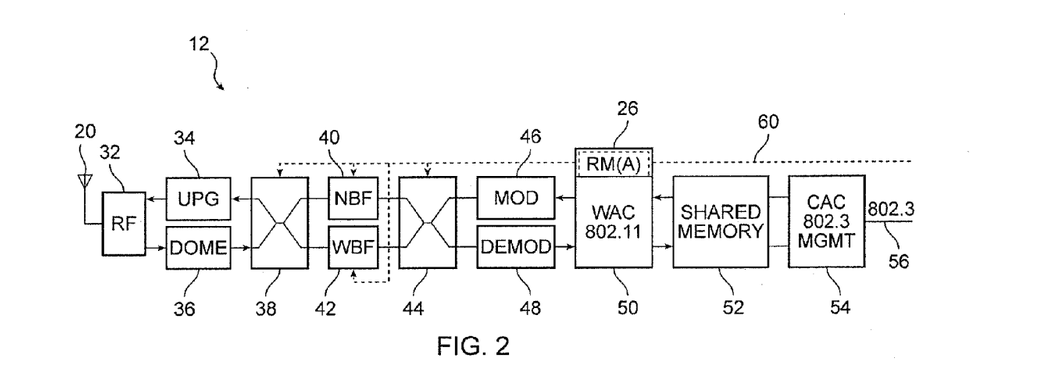
FIG. 2 is a block diagram of a specific access element according to the invention.
Figure 3:
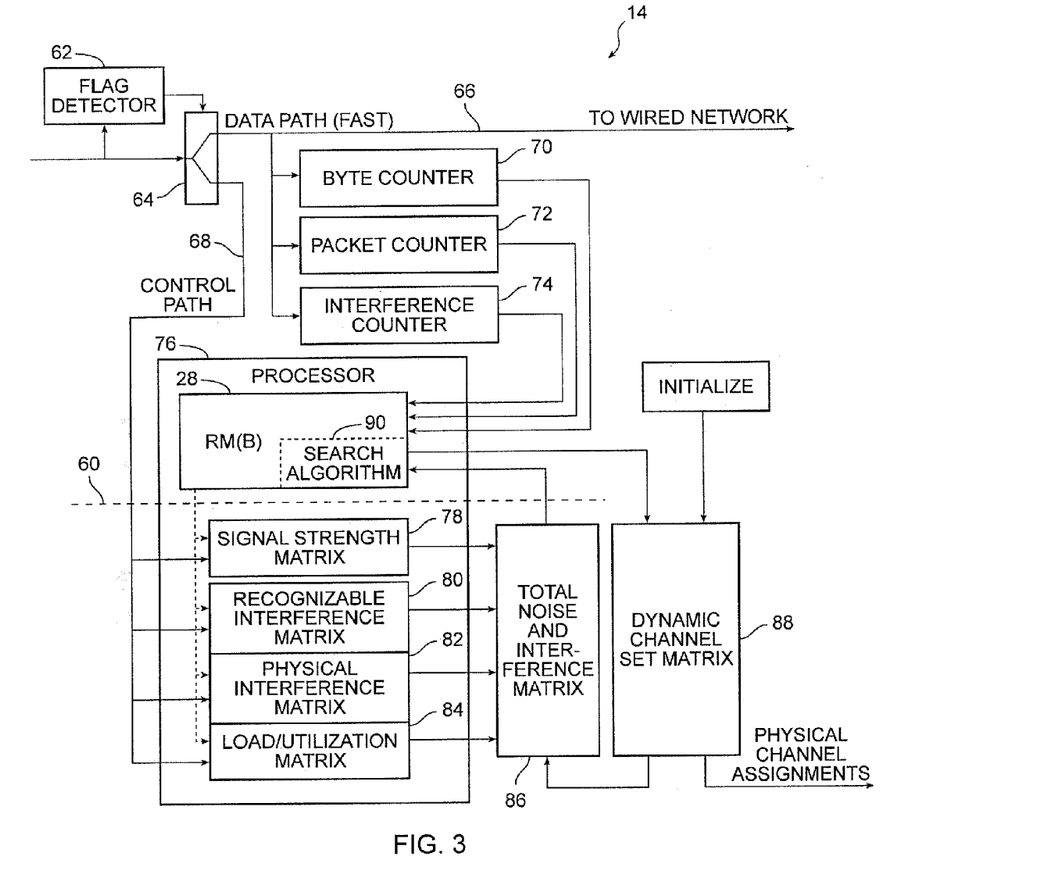
FIG. 3 is a block diagram of a central control element according to the invention.
Figure 4:
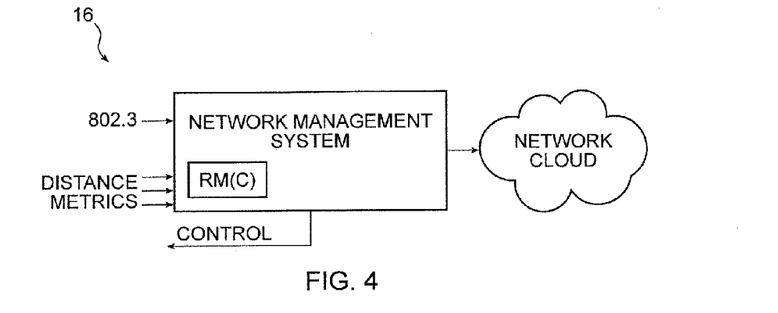
FIG. 4 is a block diagram of a network management system according to the invention.

Referring to FIG. 2, one embodiment of the access element 12 is illustrated. The ability of the radio access element 12 to operate in wide band filter (WBF) mode or narrow band filter mode (NBF) allows the radio access element 12 to increase its dynamic range when measuring the signal strength between neighboring radio access elements. Signals are sent and received through antenna 20 by a transceiver RF section 32 in a conventional manner from an upconverter 34 or to a downconverter 36. Either a narrowband filter 40 or wideband filter 42 is selected by a control signal from the Resource Manager (A) module 26 to a first bi-directional routing switch 38. The wideband filter 42 is used to support the signal bandwidth, while the narrowband filter 40 is used in distance measurements to identify the other access elements within an interference radius of the access element 12. Other techniques may be used to trade off information bandwidth for the dynamic range and increasing the range of the receiver without departing from the scope of the invention. The signals through a second bi-directional routing switch 44 are routed from a signal modulator 46 or to a signal demodulator 48 under control of the Resource Manager (A) module 26. Signals according to the local wireless standard as for example IEEE 802.11 are managed in a wireless access control (WAC) module 50 of which the resident component of the resource management element, namely Resource Man00ager (A) module 26, is a part. The WAC module shares memory 52 with a cable access control (CAC) module 54, which manages data packets in accordance with the local area network interface protocol, as for example 802.3 (Ethernet) on lines 56 which are coupled to the central control element 14 (FIG. 3). The logical control path between resource management modules A and B 26, 28 across protocol layers is represented by dashed line 60. The control signals are typically carried as packets with unique identifiers in the Ethernet environment. However, other control paths may be utilized without departing from the scope and spirit of the invention.

The central control element 14 is depicted logically in FIG. 3. However, physically it i0ncludes multiple instances of an access controller to the communications means (Ethernet Network Interface Cards), a processor, and another access controller (all not shown) to communicate with the wired network 15 to which other wireless LAN systems may be connected. The communications means internally and between the remote elements is typically some flavor of Ethernet (based on IEEE 802.3). There is both a logical data path 66 and a control path 68 between the central control element 14 and the radio access element 12. A set of counters 70, 72, 74 are incremented for every packet that is sent and received from radio access element 12. The data path is what allows the Radio Resource Manager to respond quickly to changes in the wireless network. The control path 68 allows the Radio Resource manager to communicate with the radio access element 12 and acquire the signal strength between the radio access elements and the statistical time nature of the interference sources.

More specifically, the central control element 14 receives and transmits data packets and control packets from/to a plurality of access elements 12 via the Local Area Network interface. An effective flag detector 62 distinguishes between data packets and control packets, routing them through a logical switch 64 to a high-speed data path 66 in communication with the wired network 15 or to control path 68 within the central control element 14. The data path 66 is monitored by the set of counters, such as by byte counter 70, packet counter 72 and a recognizable interference counter 74, which provide interference and load data to the Resource Manager (B) 28. Associated with each data packet is a resource management header which contains RF physical layer information, such the noise power in the channel before each received packet. This information can be used to increment the recognizable interference counter 74.

The control path 68 is coupled to a processor element 76 in which several matrices are maintained, namely a signal strength matrix 78, a recognizable interference matrix 80, a physical interference matrix 82, and a load/utilization matrix 84. In addition, there is a dynamic channel set matrix 88, as hereinafter explained. The signal strength matrix 78 collects information quantifying the signal strength between access elements. The utilization matrix 84 collects information pertaining to the activity level of each of the access elements. The recognizable interference matrix 80 collects information regarding interference from other access elements using the same protocol (e.g., 802.11) in competing wireless systems, such as those sharing the 802.11 channels but which are not controlled by the central control element 14. The physical interference matrix 82 collects information regarding noise from competing (e.g., non 802.11) sources, such as industrial devices (e.g., microwave ovens and cordless phones). All of the interference and noise data are collected at the access element 12 and communicated over the data path and control path to the central control element 14 as packetized information in the resource management header in the data path and resource management control packets in the control path, respectively.

The method according to the invention collects the following information:
 a measure of signal strength between access elements
 a measure of physical interference ("noise") which is unrecognizable interference from other unlicensed wireless systems and industrial devices
 a measure of recognizable interference as for example from foreign 802.11 devices
 a measure of instantaneous and average load or utilization
 current fixed physical channel assignment of access elements in the WLAN network The Resource Manager 26, 28 is distributed between the central control element 14 and the (wireless) access element 12, with selected processing functions being carried out centrally by the (Ethernet-accessible) network management system 16. The Resource Manager module 28 in the central control element 14 collects information from a plurality of access elements via a control channel 68 and a data channel 66. The Resource Manager module 28 according to one embodiment employs the signal strength matrix 78, the utilization matrix 84, the recognizable interference matrix 80 and the physical interference matrix 82 to construct a total noise and interference matrix 86. The dynamic channel set matrix 88 is initialized to a set of channel assignments and thereafter, under control of the Resource Manager module 28 specifies the channel assignment to minimize the performance metric 86. The object is to minimize the value or this metric, which is derived from the total noise and interference matrix 86. To this end, there is a search algorithm 90 in the Resource Manager module 28 which monitors the total noise and interference matrix 86 and updates the dynamic channel set matrix 88, which in turn modifies the total noise and interference matrix 86, forming a control loop. The output of the dynamic channel set matrix 88 specifies the physical channel assignments of the access elements 12 under control of the central control element 14.

The control channel 60 (which is actually communicated on the control path 68) allows the central control element 14 to communicate with the access elements 12. The data path allows the central control element 14 to collect interference and load information from every packet transmitted and received. This configuration allows the dynamic channel assignment algorithm to immediately view changes in recognizable interference, physical interference and utilization and to quickly optimize channel assignments in the access elements 12.

The first task in the algorithm is to create and maintain a signal strength matrix for all the remote access elements in the various wireless networks which are aware of each other. This is accomplished by having the Resource Manager (RM-B 28) in the central control element 14 and the Resource Manager (RM(A) 26) in the access element 12 both passively listen to surrounding access elements and actively probe for surrounding access elements. The Resource Manager RM(B) in the central control element 14 can schedule a radio element (CRE 18A) in the wireless network to transmit a data measurement request on a specified channel and then record responses from surrounding access elements. The data measurement probe request and the receiver information bandwidth can have a narrower information bandwidth than the normal information bandwidth in order to allow the dynamic range of the receiver to be extended beyond its normal operational range. This allows a radio element to "see" potential analog and digital interference sources beyond its normal operating range. Scheduling these measurements allows multiple measurements to be made with a single transmission and allows the detection of the transmitting signal to be recognized as a change in amplitude relative to the background noise at the scheduled time, allowing for easier detection of the measurement signal and greater dynamic range.

The second task in the dynamic channel algorithm is to create and maintain a recognizable interference matrix and a physical or unrecognizable interference matrix for all the access elements in the wireless network. These interference matrices are derived from interference and noise measurements made by each access element. This data is collected both passively and actively from both the control and the data channel:

Passively, for each packet received on the data channel at the access element a measurement of the power in the RF channel is made immediately before the received packet. This interference measurement is sent to the central control element via the data channel by appending a Radio Resource Manager header to the data packet.

Actively, statistical interference data is gathered by the Radio Resource Manager in the controller by sending a message to the Radio Resource Manager element requesting a number of power measurements of the RF channel to be made at specified rate. The control channel allows statistical data on the time nature of the interference in the RF channel to be gathered which is not possible in the data channel. This allows the recognizable interference data and physical and interference data to be measured.

The third task in the Radio Resource Manager is to create and maintain a load or utilization matrix for the access elements. The information for this matrix is collected on the data channel. As shown in FIG. 3, for every packet received and transmitted by an access element, one or more counters (70, 72, 74) in the central control element 14 representing number of packets and bytes is incremented. The Radio Resource Manager (RM(B)) 28 then examines the counters over a regular time interval to determine the load for each access element. This matrix contains the percentage of time an access element has been busy transmitting and receiving data over a specified period of time.

These four matrices are the input to a search algorithm that searches for a channel set that minimizes the total interference power over the entire network in terms of interference between access elements.

An example of the form and processing of the main data elements in the dynamic channel algorithm to determine the optimal channel set for a plurality of access elements is illustrated with respect to the following matrix forms. As shown in Equation 1, the signal strength matrix contains the signal strength (in mW) between the access elements.

Error! Objects cannot be created from editing field codes. (1)

Note that S is a square matrix where n equals the number of radios in the network and that $S_{ij}$ equals zero (0) for i=j.

Equation 2 shows the utilization matrix and represents how busy each radio is in the network.

$U=[U_1 \ldots U_n]$, where, in one implementation, $0 \leq U_j \leq 1$. (2)

The n×n signal strength matrix is multiplied row-by-row by the 1×n utilization matrix to form an n×n average signal strength matrix that represents the average power an access element sees from surrounding access elements. Equation 3 is an average signal strength matrix A.

Error! Objects cannot be created from editing field codes, $A_{ij}=U_j S_{ij}$ (not a matrix multiply) (3)

The average signal strength matrix is formed for the convenience of processing (not shown in FIG. 3) as an element by element product of the utilization matrix with each row of the signal strength matrix and represents the average power seen from the neighboring radios of each radio.

Equation 4 is a channel set matrix.

Error! Objects cannot be created from editing field codes. (4)

m—number of channels
n—number of radios

The channel set matrix represents the possible channel assignments for each radio in the network. The channel set matrix shown is a n×m matrix where n is the number of radios and m is the number of channels. For each row in the matrix one element is set to one representing the channel section for the access element. All other elements in the row are zeroes. Note that there are $m^n$ possible channel assignment matrixes. For 802.11b wireless network environments, there are three possible non-overlapping channels and, for n radios, the channel set matrix would be n×3 in an implementation where only non-overlapping channels are assigned. In such an implementation it should be noted that there at least $3^n$ possible channel set matrices. In other implementations, overlapping channels, such as all 11 channels in 802.11b or a subset of all available channels, may also be incorporated into the channel assignment algorithm as discussed more fully below.

Equation 4a is an adjacent channel set matrix.

Error! Objects cannot be created from editing field codes. (4a)

The adjacent channel set matrix, D, is derived from the channel set matrix, C. The D matrix is formed for the convenience of processing and is not shown in FIG. 3. The adjacent channel matrix, D, shows all channels adjacent to those in the channel set matrix, C. In one implementation, $D_{ij}$ equals 1 if channel j is the first adjacent channel to the channel assigned to radio, $AP_i$. The exact transformation from the channel set matrix, C, to the adjacent channel set matrix, D, depends on the channel layout. In the didactic example described herein, the channel assignments are contiguous; that is, channel j is adjacent to both channel j−1 and channel j+1. Exceptions are the first channel, which is adjacent only to the second channel, and the last channel m, which is adjacent only to channel m−1. Accordingly, to create the adjacent channel set matrix from the channel set matrix, in one implementation, for each row i, for each $C_{ij}$ that equals 1, in row i of the adjacent channel set matrix, D, the values at column j−1 and column j+1 are each set to 1. All other elements of row i, in one implementation, are set to zero. This process is repeated for all rows. Note the exceptions for channel assignments 1 and m. In these cases, ones are set only at channel 2 and channel m−1, respectively.

In other implementations, the values for the adjacent channels in the adjacent channel set matrix may be between zero and one, as opposed to one. In addition, the values for additional adjacent channels j−2 and j+2 (second adjacent channels), j−3 and j+3 (third adjacent channels), and so on, may be set to values between zero and one to reflect the seriousness of the interference encountered from radios operating on these channels. In one implementation, the values for the first adjacent channels (j−1, j+1) are greater than the values for the other adjacent channels j−2 and j+2 in the adjacent channel set matrix; the values for channels j−2 and j+2 are greater than the vales for channels j−3 and j+3; and so on.

The interference matrix I of Equation 5 (which is also formed for convenience of processing and is not shown in FIG. 3) describes the interference both co-channel and adjacent channel calculated at each radio ($AP_i$).

$$I = \begin{bmatrix} I_{11} & \cdots & I_{1m} \\ \vdots & & \\ \vdots & & \\ I_{n1} & \cdots & I_{nm} \end{bmatrix}, I = AC + dAD \quad (5)$$

The interference matrix is an n×m matrix where each element $I_{ij}$ gives the interference observed at $AP_i$ on channel j. The interference matrix, I, in one implementation, is computed using matrix multiplication, as follows:

$I=AC+dAD$, where d is a weighting factor (in one implementation, d<1) used to indicate the importance of adjacent channel interference.

In one implementation, adjacent channel interference is not taken into account; in such an implementation d can be set to zero or the adjacent channel set matrix can be eliminated from the computation of the interference matrix I. That is, the n×n average signal strength matrix is multiplied by the n×m channel set matrix to form the interference matrix, which represents what an access element sees from surrounding access elements on each channel.

This interference matrix, I, is then combined with the recognizable interference matrix 80 (FIG. 3) (F) and the physical interference matrix 82 (FIG. 3) (N) to form the total noise and interference matrix 86 (FIG. 3) (T) of Equation 6 that represents the total noise and interference seen by each access element on each channel. The recognizable interference matrix, N, is an n×m matrix where $N_{ij}$ characterizes the noise (in mW) each radio ($AP_i$) receives on channel j. Again n is the number of radios (APs), while m is the number of channels. Similarly, the recognizable interference matrix, F, is an n×m matrix where $F_{ij}$ describes the interference level (in mW) due to foreign WLANs that each radio ($AP_i$) detects on each channel j. The "i", "n", and "f" factors in equation 6 represent weights to account for the fact that each type of interference has a different impact on the system.

Error! Objects cannot be created from editing field codes, $T = iI + nN + fF$ (6)

For convenience of storage and calculation, this total noise and interference matrix 86 is then reduced to a compressed total noise and interference matrix TC for the network (not shown in FIG. 3).

$$TC = \begin{bmatrix} TC_1 \\ \vdots \\ \vdots \\ \vdots \\ TC_n \end{bmatrix},$$  (7)

Error! Objects cannot be created from editing field codes., where $TC_i$ is the $i^{th}$ element of TC.

The possible channel set matrices are searched to find a set that minimizes the sum of the elements in the compressed total noise and interference matrix, which is notably an N×1 form of matrix, and the performance metric derived from this matrix. The compressed total noise and interference matrix represents the total interference and noise across the network and is used to derive the metric to be minimized by searching possible channel assignment combinations. The metric is in the form shown in Equation 8.

Error! Objects cannot be created from editing field codes. (8)

The following pseudo code provides an implementation example of the Dynamic Channel Assignment algorithm.

```
function [I]=interference (A, C, d)
% function [I]=interference (A, C, d)
%
% this function computes an interference matrix I, where
I=A*C+d*A*D
% A=average signal strength matrix (numNodes×numNodes)
% C=channel assignment matrix (numNodes×numChannels)
% d=relative contribution of adjacent channel interference,
d in the interval [0 . . . 1)
% (D is computed as a temporary matrix, representing the
adjacent channels to
% the channels assigned in C.)
%
D=zeros(numNodes, numChan);
for (node=0; node<numNodes; node++)
  for (channel<0; channel<numChan; channel++)
    if (C(node, channel)==1)
      % handle boundary cases:
      if (channel==0) % left edge
        D(node, 1)=d;
      else if (channel==numChan-1) % right edge
        D(node, channel-1)=d;
      else % normal case: in the middle
        D(node, channel-1)=d;
        D(node, channel+1)=d;
% create the final interference matrix I that we return:
I=A*C+A*D;
function [ch]=channelSearchNewFN(S,U,N,F,d,numChan)
% function [ch]=channelSearchNew(S,U,N,F,d,numChan)
%
% this function will exhaustively search each a
% signal strength submatrix S, a utilization matrix U (already
% scaled by its contribution factor), a noise matrix N (already
% scaled by its contribution factor), a foreign 802.11%
% interference matrix (already scaled by its contribution factor),
% and an adjacent-channel interference matrix D.
%
% S is the signal strength matrix in (mW) (numNodes×numNodes)
% U is the utilization vector scaled by contribution factor (numNodes×1)
% N is the noise matrix scaled by contribution factor (numNodes×numChan)
% F is the foreign 802.11 matrix scale by contribution factor(numNodes×numChan)
% d=a constant which sets the relative importance of adjacent-channel interference
% ch is the list of channel assignments for the nodes (numNodes×1)
numNodes=length(S);
d=0.5; % d=0.5 in one embodiment. d must be in the interval [0 . . . 1)
% These are all the channel assignments
channelPerm=eye(numChan);
finalChannelAssignment=[zeros(numNodes,numChan)];
A=S.*(U*ones(1,numNodes));
% STEP 1: find the LRAD with the largest attachment to
% others excluding the attachment to itself
attach=((0.5*(sum(A)+sum(A')))'*ones(1,numChan))+ N+F;
% attach is a numNodes×numChans matrix where attach (i,j)
% is the relative interference seen by node i on channel j
% due to all other nodes in the system (except itself)
% Find the max node over all Nodes and Channels
[maxTemp, elem]=max(attach);
[maxVal, elem1]=max(maxTemp);
```

```
maxNode=elem(elem1);
% now given the current channel assignment pick the channel that
% minimizes the interference seen at node maxNode
T=interference(A, finalChannelAssignment, d)+N+F;
[minVal, minCh]=min(T(maxNode:));
% For the new finalChannelAssignment Matrix
finalChannelAssignment(maxNode:)=channelPerm
    (minCh:);
% get the assigned Irads ready for looping
assignedLRADS=zeros(1,numNodes);
assignedLRADS(1,maxNode)=1;
% repeat until all channels are assigned, but each time consider interference
% only those nodes that have already been assigned
while(sum(assignedLRADS)<numNodes)
% find the LRAD with the largest attachment to those already assigned channels
attach=(0.5*((A*assignedLRADS)+
    (assignedLRADS*A')'))*ones(1,numChan)+N+F;
% attach is a numNodes×numChans matrix where attach (i,j)
% is the relative interference seen by node i on channel j
% due to all other assigned nodes in the system (excluding itself)
% when we maximize only consider those nodes that are not attached
attach=diag(ones(1,numNodes)−assignedLRADS)*attach;
% find the Node and Channel where the biggest attachment occurs. Do not
[maxTemp, elem]=max(attach);
[maxVal, elem1]=max(maxTemp);
maxNode=elem(elem1);
% Compute our Combined signal load noise and Interference matrix
T=interference(A, finalChannelAssignment, d)+N+F;
% pick the channel for maxNode that minimizes this metric
[minVal, minCh]=min(T(maxNode:));
% add the nodes channel assignment to the list
finalChannelAssignment(maxNode:)=channelPerm
    (minCh:);
% mark the node as assigned for next loop
assignedLRADS(1,maxNode)=1;
end
% format the output for the user
channels=1:numChan;
channels=channels';
ch=finalChannelAssignment*channels;
```

The invention has a number of advantages. Its use of narrow band radio frequencies for testing propagation extends the effective distance vision for wideband signals. The distributed resource management function allows the application layer of the communication protocol to have visibility of activities in nonadjacent layers and thus permits both rapid and well-optimized resource allocations to be carried out. The separation of data from control information early on allows data to be propagated rapidly without sacrificing the versatility of historically-robust load distribution management. The virtualization of noise into pseudochannels makes it possible to quantify noise in the context of distance matrix calculations. The relatively thorough multifaceted analysis of channel characteristics and loading permits discrimination between channels according to a practical measure of goodness. In addition, the use of an adjacent channel interference matrix permits the use of overlapping channels in the channel assignment matrix, such as all eleven channels in an 802.11 (b) wireless network. Of course, however, the channel assignment methodology described above can be used in connection with a variety of wireless network environments, including 802.11a and 802.11g, having a limited number of physical channels.

The invention has been explained with reference to specific embodiments. For example, although the embodiments described above operate in connection with 802.11 networks, the present invention can be used in connection with any wireless network environment requiring assignment of a limited number of physical channels across a plurality of radios or access elements. Other embodiments will be evident to those of ordinary skill in the art. It is therefore not intended that the invention be limited except as indicated by the appended claims.

What is claimed is:

1. A method, comprising:
   monitoring, at one or more wireless network access elements, signal strength of signals transmitted by respective neighboring wireless network access elements;
   collecting information from said wireless network access elements and converting said information into reportable data about signal strength observed during the monitoring the signal strength of signals by the one or more wireless network access elements and about access element load, wherein the reportable data about access element load comprises:
      data regarding wireless network traffic load corresponding to each of said wireless network access elements over a period of time; and
      physical interference;
   creating a signal strength matrix describing the signal strength observed between each of the access elements;
   creating a utilization matrix describing the load observed at each access element over a given time interval;
   combining the signal strength matrix and the utilization matrix to create an average signal strength matrix describing the average signal strength observed between each of the access elements;
   creating a first interference matrix by matrix-multiplying the average signal strength matrix by a channel assignment matrix describing a plurality of possible combinations of channel assignments of the physical channels across the access elements; and
   identifying, based at least in part, on said physical interference associated with concurrent signal transmissions of the wireless network access elements, a combination of channel assignments for the one or more wireless network access elements from the plurality of possible combinations of channel assignments and assigning channels for concurrent, respective use by said wireless network access elements based on the identified combination of channel assignments.

2. The method of claim 1 further comprising constructing, from said physical interference, a physical interference matrix that represents noise power within each said physical channel.

3. The method of claim 1 wherein the reportable data about access element load further comprises recognizable interference, the method further comprising constructing, from said recognizable interference, a recognizable interference matrix.

4. The method of claim 2 wherein said identifying is further based on, at least in part, said physical interference matrix.

5. The method of claim 3 wherein said identifying is further based on, at least in part, said recognizable interference matrix.

6. The method of claim 2 wherein said constructing step includes:
prioritizing wireless network access elements according to information derived from said interference matrix to obtain priorities;
assigning channels according to said information derived from said first interference matrix to access elements according to said priorities from highest to least until all access elements have channels assigned thereto.

7. The method of claim 1 further comprising causing one or more wireless network access elements to probe for neighboring wireless network access elements and to observe and detect signal strength of signals transmitted by the neighboring wireless network access elements by transmitting a probe request, receiving one or more probe responses to the probe request, and detecting strength of the signals carrying the one or more probe responses.

8. A system for dynamically assigning said physical channels to a set of wireless network access elements, comprising:
a first resource management module associated with each access element for collecting physical layer information from said wireless network access elements and converting said physical layer information into reportable data about signal strength observed during the monitoring the signal strength of signals by the one or more wireless network access elements and about access element load, wherein the reportable data about access element load comprises:
data regarding wireless network traffic load corresponding to each of said wireless network access elements over a period of time; and
physical interference; and
a second resource management module associated with said central control element, said second resource management module in communication via a packetized communication path with said first resource management module, for processing said reportable data to:
cause one or more access elements to monitor signal strength of signals transmitted by respective neighboring wireless network access elements;
create a signal strength matrix describing the signal strength observed between each of the access elements;
create a utilization matrix describing the load observed at each access element over a given time interval;
combine the signal strength matrix and the utilization matrix to create an average signal strength matrix describing the average signal strength observed between each of the access elements;
create a first interference matrix by matrix-multiplying the average signal strength matrix by a channel assignment matrix describing a plurality of possible combinations of channel assignments of the physical channels across the access elements; and
identify a combination of channel assignments for the one or more wireless network access elements from the plurality of possible combinations of channel assignments and assign channels for concurrent, respective use by said wireless network access elements based on the identified combination of channel assignments; and
select the identified combination of channel assignments based at least in part on the physical interference associated with concurrent signal transmissions of the wireless network access clients.

9. The system of claim 8 further including front-end signal reception means for detecting presence of potential physical interference comprising narrowband sensors and further including a selector for selecting between a wideband sensor and a narrowband sensor.

10. The system of claim 9 wherein said wideband sensor includes a wideband filter and said narrowband sensor includes a narrowband filter.

11. The system of claim 8 wherein said central control element further includes high speed dataflow counters for quick update of interference and load data.

12. The system of claim 8 wherein, in said packetized communication path, every data packet has a header with physical layer information appended to said packet.

13. The system of claim 8 wherein the second resource management module is operative to cause one or more access elements to transmit a probe request, receive one or more probe responses to the probe request, and detect strength of the signals carrying the one or more probe responses.

14. An apparatus, comprising:
means for monitoring, at one or more wireless network access elements, signal strength of signals transmitted by respective neighboring wireless network access elements;
means for collecting physical layer information from said wireless network access elements and converting said physical layer information into reportable data about signal strength observed during the monitoring the signal strength of signals by the one or more wireless network access elements and about access element load, wherein the reportable data about access element load comprises:
data regarding wireless network traffic load corresponding to each of said wireless network access elements over a period of time; and
physical interference;
means for creating a signal strength matrix describing the signal strength observed between each of the access elements;
means for creating a utilization matrix describing the load observed at each access element over a given time interval;
means for combining the signal strength matrix and the utilization matrix to create an average signal strength matrix describing the average signal strength observed between each of the access elements;
means for creating a first interference matrix by matrix-multiplying the average signal strength matrix by a channel assignment matrix describing a plurality of possible combinations of channel assignments of the physical channels across the access elements; and
means for identifying a combination of channel assignments for the one or more wireless network access elements from the plurality of possible combinations of channel assignments and assigning channels for concurrent, respective use by said wireless network access elements based on the identified combination of channel assignments, wherein the identified combination of channel assignments is selected based at least in part on the physical interference associated with concurrent signal transmissions of the wireless network access clients.

* * * * *